US007373411B2

(12) United States Patent
Robinson

(10) Patent No.: US 7,373,411 B2
(45) Date of Patent: May 13, 2008

(54) CONFIGURATION INFORMATION GENERATION SYSTEM AND METHOD

(75) Inventor: Mike C. Robinson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 803 days.

(21) Appl. No.: 10/061,608

(22) Filed: Feb. 1, 2002

(65) Prior Publication Data

US 2003/0149782 A1 Aug. 7, 2003

(51) Int. Cl.
*G06F 15/16* (2006.01)

(52) U.S. Cl. ...................... 709/230; 709/201; 709/202; 709/203; 709/220

(58) Field of Classification Search ................ 709/230, 709/201; 713/1; 719/313
See application file for complete search history.

(56) References Cited

U.S. PATENT DOCUMENTS 6,795,862 B1 * 9/2004 Keohane et al. ............ 709/230
6,842,766 B2 * 1/2005 Brockway et al. .......... 709/203
6,895,088 B1 * 5/2005 Nelson et al. .............. 379/219
7,047,292 B1 * 5/2006 Stewart et al. .............. 709/224
7,099,947 B1 * 8/2006 Nadeau et al. .............. 709/229
2003/0112765 A1 * 6/2003 Gaspard et al. ............. 370/252
2005/0108492 A1 * 5/2005 Zsohar ....................... 711/167
2005/0165834 A1 * 7/2005 Nadeau et al. .......... 707/103 R

OTHER PUBLICATIONS

Marconi: "SNMP Management—User Manual" Open NSU Manuals, vol. 1.1, Nov. 2000, pp. 39-40.

D. Harrington, et al.: "Request For Comments: 2571—An Architectrue for Describing SNMP Management Frameworks," Apr. 1999, Retrieved on May 15, 2003, from the Internet: <URL:http://www.faqs.org/ftp/rfc/pdf/rfc2571.txt.pdf> Pertinent Pages: p. 11, line 32; p. 14, lines 15-19; p. 27, line 24; p. 28, line 5; p. 33, lines 13-29; p. 48, lines 9-12; p. 56, lines 14-20.

Cherkaoui, et al.: "Towards a Modular and interoperable SNMPv3," IEEE, 1998, pp. 26-31. Pertinent pages: figures 2 & 3; p. 27, left-hand column, line 6-10; p. 28, left-hand colmn, line 14-24.

* cited by examiner

*Primary Examiner*—Yves Dalencourt

(57) ABSTRACT

In one embodiment of the present invention, a configuration information generation method receives an indication to begin the configuration information generation method. A determination is made which versions of a simple network management protocol a network device supports, wherein the versions support a security feature. Information is forwarded for inclusion in a printout, wherein the information includes an indication of which versions of the simple network management protocol the network device supports.

7 Claims, 5 Drawing Sheets

CONFIGURATION INFORMATION GENERATION SYSTEM AND METHOD

TECHNICAL FIELD

The present invention relates to configuration page information generation.

BACKGROUND ART

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of distributed network resources that facilitate leveraged utilization of centralized resources. While utilization of distributed resources communicatively coupled in a network is often advantageous, appropriate configuration and management of the distributed resources are usually critical to operational integrity and very complex. Convenient and simplified presentation of network management information is usually very desirable.

Networks are often arranged in numerous configurations comprising a variety of network types. Some of the most popular types of network architectures comprise Ethernet, token ring, Fiber Distributed Data Interface (FDDI), Frame Relay, Integrated Services Digital Network (ISDN), X.25, and Synchronous Data Link Control (SDLC). The networks usually consist of a variety of different devices (e.g., clients, servers, routers, hubs, gateways, etc.) that are communicatively coupled by various communication mediums (e.g., coaxial cable, twisted-pair cable, fiber optic cable, radio waves, microwaves, etc.). These networks are often arranged in architectural hierarchies such as local area networks (LANs) and wide area networks (WANs). Usually, LANs are distinguished from WANs based upon the geographical area they cover and sometimes the number of users connected to the network. The significant variety of devices, communication mediums, and communication protocols that may be included in a network increase the difficulty and complexity of compatible network management.

Standardized protocols typically provide beneficial techniques that attempt to address compatibility problems often encountered with otherwise ad-hoc network management features of various network devices. One such standardized protocol is an Simple Network Management Protocol (SNMP). SNMP is a set of rules that govern communication of network management information (e.g., network device statistics) and network devices that have SNMP enabled can be managed with SNMP network management software. Various network devices track information associated with their operational activities and/or information. For example, a router may track the amount of information communicated on each interface port and errors that occur or a Web server might keep a tally of the number of hits it receives. The operational activity and/or configuration information is typically stored in a database often referred to as a Management Information Base (MIB).

Network management information is usually vital for maintaining network operations and providing a level of security for the network management information is often desirable. While some network management activities (such as monitoring and performance management) may not require strong security protection, it is typically beneficial to provide relatively stringent security measures directed to protecting other network management activities (e.g., configuration, accounting and fault management) from illicit interference (e.g., snooping, hacking, etc.).

Simple Network Management Protocols usually provide for the optional implementation of some level of security with later versions of SNMP (e.g., version 3) typically facilitating a wider range of optional security provisions. Knowing an SNMP version is supported is usually very advantageous and provides an indication of security levels that are potentially available. In addition to knowing the SNMP version that is supported, it is also often beneficial to know enabled security level information within the SNMP version. For example, a network manger may have a false sense of security if the network device is compatible with an SNMP version that supports relatively strong security provision features but the strong security provision features are not enabled. A convenient and accurate indication of enabled security for network management information communications usually facilitates implementation of security measures directed towards minimizing illicit interference with network operations and management activities.

What is desired is a system and method for facilitating convenient access to information associated with a supported network management protocol.

DISLOSURE OF THE INVENTION

In one embodiment of the present invention, a configuration information generation method receives an indication to begin the configuration information generation method. A determination is made which versions of a simple network management protocol a network device supports, wherein the versions support a security feature. Information is forwarded for inclusion in a printout, wherein the information includes an indication of which versions of the simple network management protocol the network device supports. In one embodiment of the present invention, the printout is a configuration page that includes an indication of which versions of the simple network management protocol the network device supports and an indication of an enabled simple network management protocol security level.

BEST MODES FOR CARRYING OUT THE INVENTION

Figure 1:
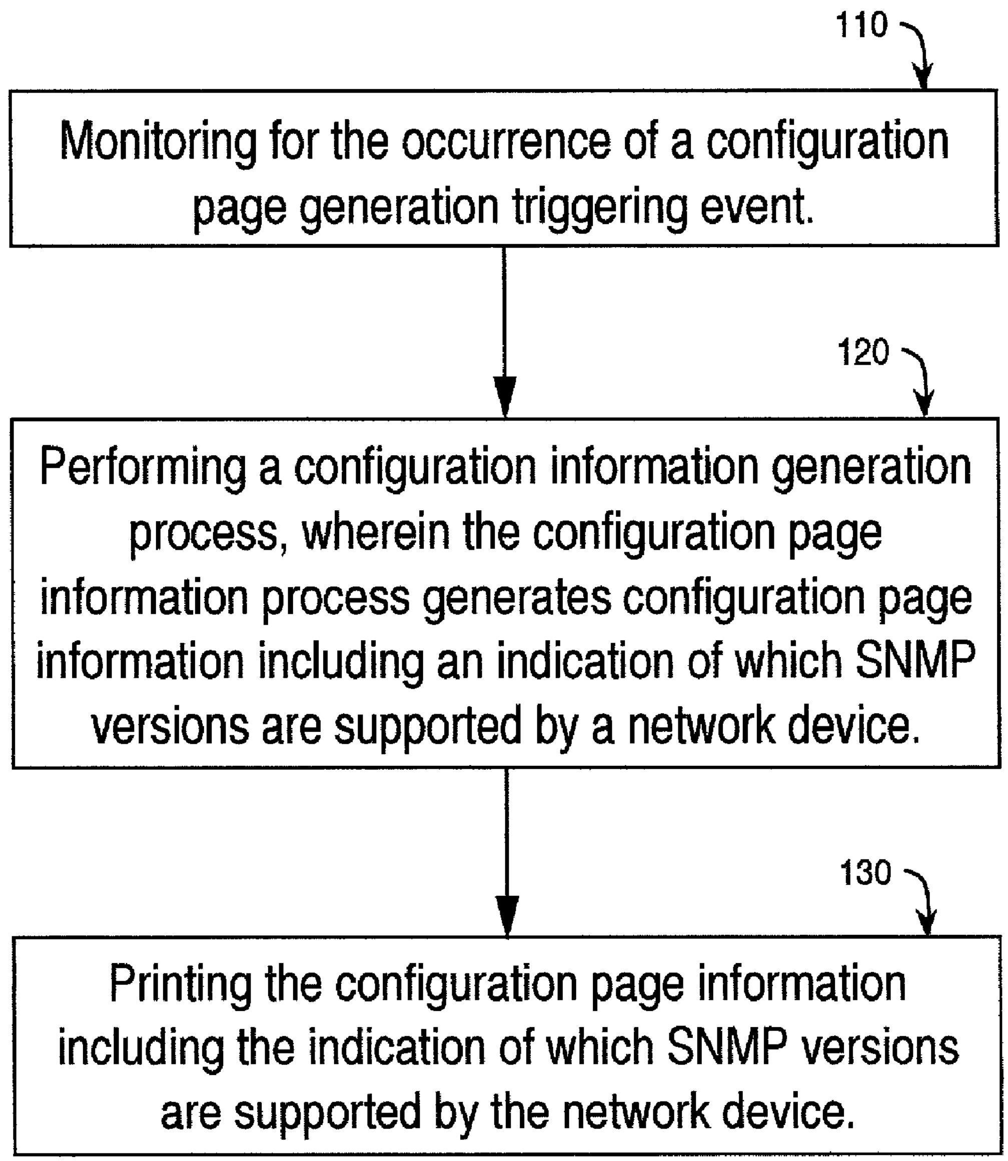
FIG. 1 is a flow chart of one embodiment of a present invention configuration page method.

Reference will now be made in detail to the preferred embodiments of the invention, a configuration page information generation system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within an electronic system. These descriptions and representations are the means used by those skilled in the digital arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in the electronic system.

It has proven convenient at times, principally for reasons of common usage, to refer to the signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or as apparent from the following discussions, it is appreciated that throughout the present invention, discussions utilizing terms such as processing, computing, calculating, determining, displaying or the like, refer to an action or processes of an electronic device that manipulates and transforms data represented as physical (electronic) quantities within the system (e.g., within registers, logic gates, memories, etc.) into other data similarly represented as physical quantities within the system devices or other such information storage, transmission or display devices.

In one embodiment, the present invention facilitates convenient access to information associated with a supported network management protocol. In one embodiment, the present invention provides an indication of which simple network management protocol versions a network device supports. The present invention also provides an indication of a simple network management protocol security level in one embodiment. In one exemplary implementation of the present invention, an indication of a minimum simple network management protocol security level is provided. In one embodiment of the present invention, the indication of which simple network management protocol versions a network device supports and the indication of a simple network management protocol security level are forwarded for inclusion in a configuration page.

FIG. 1 is a flow chart of configuration page method 100, one embodiment of the present invention. In one embodiment of configuration page method 100, a configuration page is printed including an indication of which SNMP versions are supported by a network device. In one exemplary implementation, the configuration page includes an indication of a minimum simple network management protocol security level.

In step 110, configuration page method 100 monitors for the occurrence of a configuration page generation triggering event.

In step 120, a configuration information generation process is performed which generates configuration information including an indication of which SNMP versions are supported by a network device. In one exemplary implementation of the present invention, the configuration information includes an indication whether SNMP version 1 (SNMPv1), SNMP version 2 (SNMPv2), or SNMP version 3 (SNMPv3) are supported. In one embodiment of the present invention, the configuration information also includes an indication of an enabled security feature that is supported by the network device (e.g., a minimum security level).

In step 130, the configuration information is printed in a configuration page including the indication of which SNMP versions are supported by the network device. In one embodiment of the present invention, the indication of a security feature that is enabled on the network device (e.g., a minimum security level) is also printed.

Figure 2:
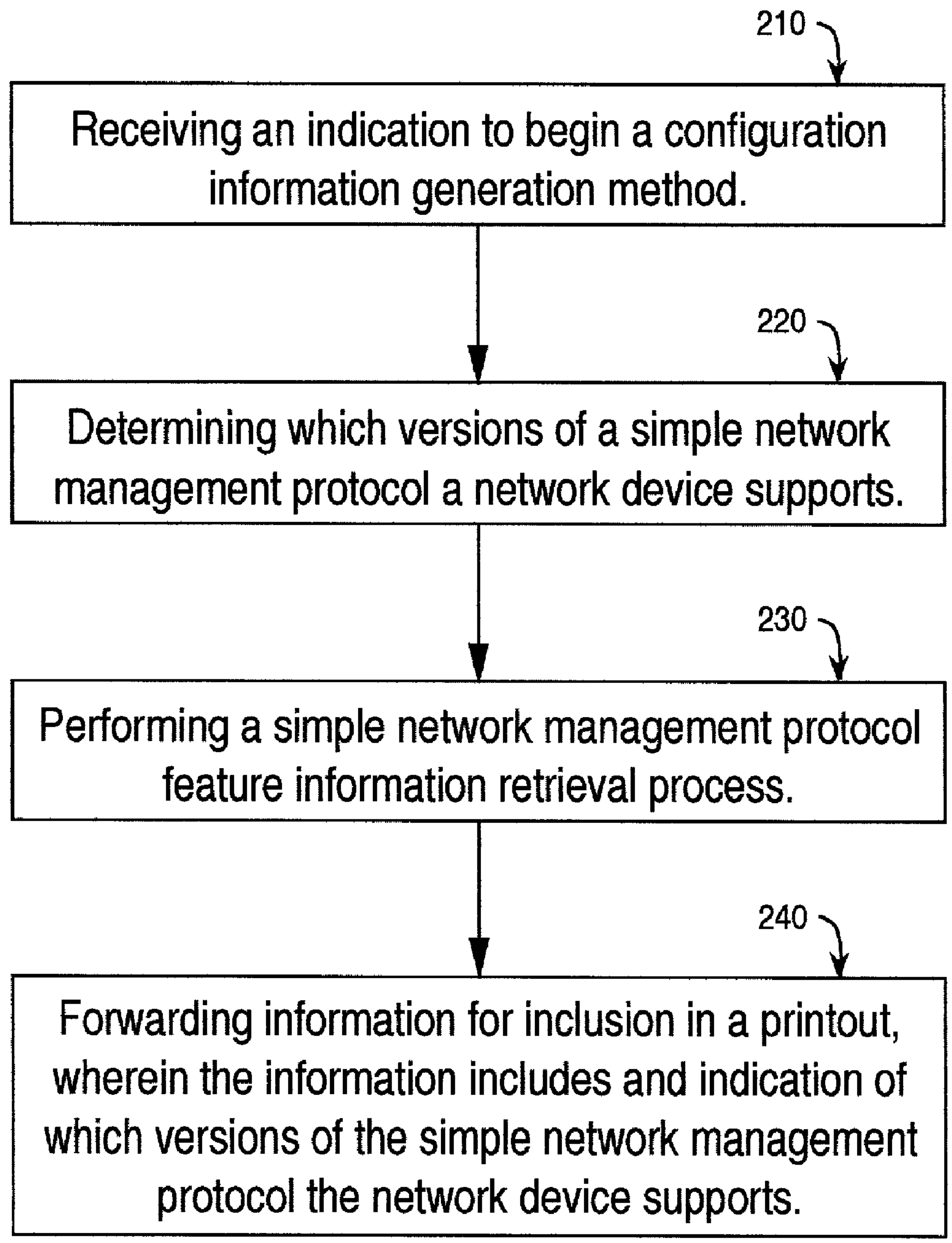
FIG. 2 is a flow chart of one embodiment of a present invention configuration page information generation method.

FIG. 2 is a flow chart of configuration information generation method 200, one embodiment of the present invention. In one embodiment, configuration information generation method 200 is the configuration information generation process utilized in step 120 of configuration page method 100. In one exemplary implementation, configuration information generation method 200 facilitates compilation of information for utilization in a configuration page printout. In one embodiment of configuration information generation method 200, an enabled simple network management protocol security level (e.g., a minimum enabled security level) is printed.

In step 210, an indication to begin configuration information generation method 200 is received. In one embodiment of the present invention, the indication to begin the configuration information generation method corresponds to the occurrence of a configuration page generation triggering event. In one exemplary implementation of the present invention, the indication to begin the configuration information generation method is received when configuration page method 100 detects the occurrence of a configuration page generation triggering event in step 110.

In step 220, a determination is made which simple network management protocol versions a network device supports. In one embodiment the simple network management protocol versions support a security feature. It is appreciated that in some implementations of the present invention, different versions of the simple network management protocol support different security features. In one embodiment of the present invention, versions 1, 2 and/or 3 of SNMP are supported and versions 1 and 2 support a community name security feature and version 3 supports authentication and privacy security features. The supported security features may or may not be enabled. In one exemplary implementation, enablement of a security feature depends upon authentication and privacy requirements associated with a SNMP user account.

In step 230, a simple network management protocol feature information retrieval process is preformed. The simple network management protocol feature information retrieval process retrieves simple network management protocol feature information. In one embodiment of the present invention, the simple network management protocol feature information includes an indication of an enabled simple network management protocol security level. In one embodiment of the present invention, the simple network management protocol feature information includes an indication an enabled security level does not support authentication and privacy features. In one exemplary implementation of the present invention, simple network management protocol feature information includes an indication an enabled security level does support authentication and privacy features. In one exemplary implementation of the present invention, simple network management protocol feature information includes an indication an enabled security level supports authentication but does not support privacy features. In one embodiment of the present invention, simple network management protocol feature information includes an indication a security level supports a set community name.

In step 240, the configuration information is forwarded for inclusion in a printout (e.g., a configuration page), wherein said information includes an indication of which versions of the simple network management protocol the network device supports. In one embodiment of the present invention, forwarded configuration information includes information indicating enabled simple network management protocol features. For example, the forwarded configuration information includes an indication of an enabled simple network management protocol security level. In one embodiment of the present invention, the configuration information includes an indication simple network management protocol is not supported. In one embodiment of the present invention, configuration information corresponding to a desired metric is forwarded.

The present invention is readily adaptable for forwarding configuration information in accordance with a variety of desired metrics. In one embodiment of the present invention, an indication of a minimum enabled security level is forwarded. In one embodiment, an indication of a maximum enabled security level is forwarded. In one exemplary implementation of the present invention, information associated with an audit of configuration information is forwarded. For example, information indicating the number of SNMP user accounts with authentication and privacy features enabled, the number of SNMP user accounts with authentication features enabled and privacy features not enabled, and the number SNMP user accounts with authentication features and privacy features not enabled.

In one embodiment of the present invention, configuration information generation method 200 is implemented on a computer system. The computer system comprises a memory that stores instructions (e.g., on a computer readable medium) for implementing configuration information generation method 200 and the memory is coupled to a bus for communicating the instructions to a processor that executes the instructions. In one exemplary implementation, the computer system determines which simple network management protocol versions a network device supports, retrieves simple network management protocol feature information, and forwards information indicating supported simple network management protocols versions and security features. In one exemplary implementation of the present invention, a simple network management protocol feature information retrieval process is implemented on the computer system. In one exemplary implementation of the present invention, a desired metric process is implemented on the computer system.

Figure 3:
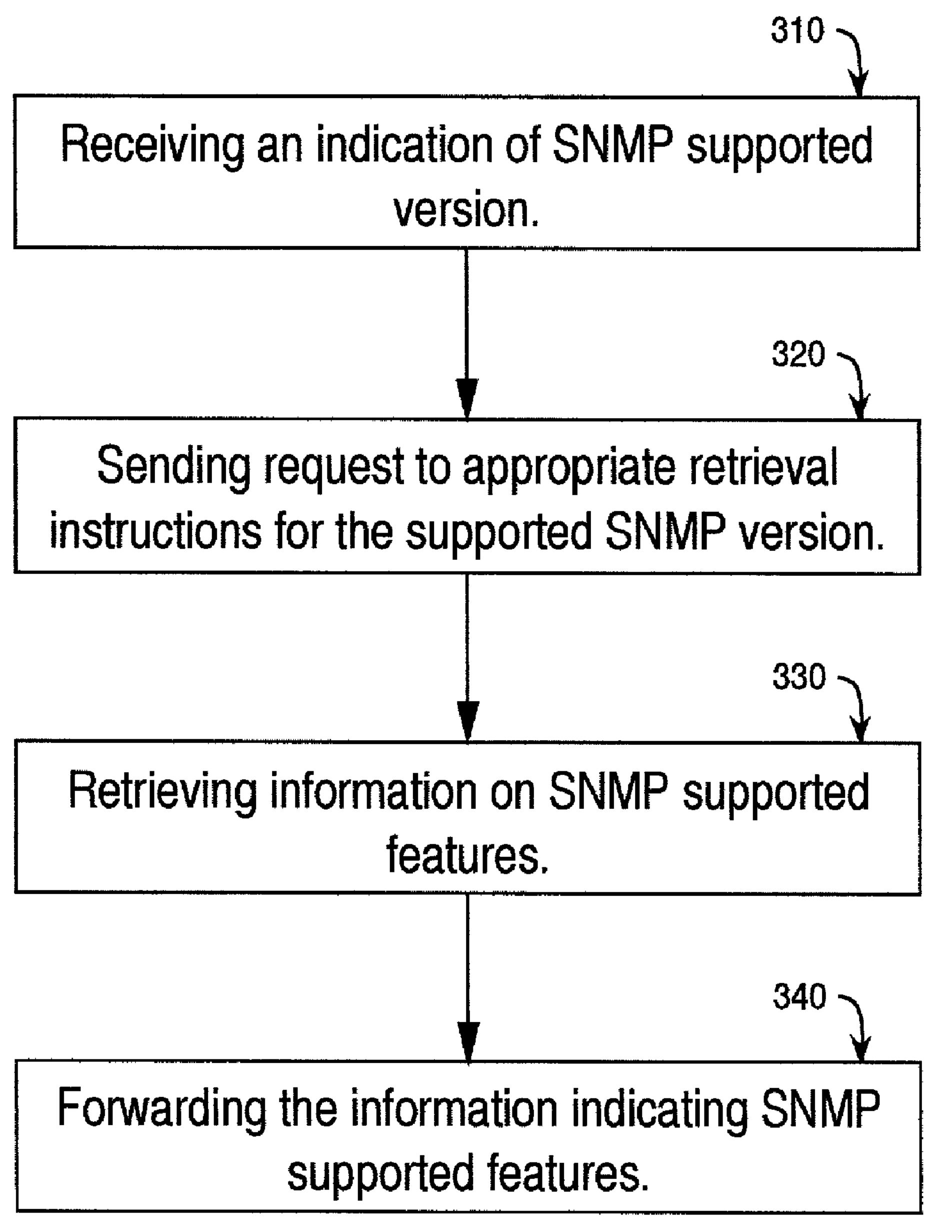
FIG. 3 is a flow chart of one embodiment of a present invention simple network management protocol feature information retrieval process.

FIG. 3 is a flow chart of simple network management protocol feature information retrieval process 300, one embodiment of a present invention simple network management protocol feature information retrieval process. In one embodiment, simple network management protocol feature information retrieval process 300 is the simple network management protocol feature information retrieval process included in step 230 of configuration page information generation method 200 (shown in FIG. 2).

In step 310, an indication of a supported SNMP version is received. In one embodiment of the present invention, the indication of the supported SNMP version corresponds to the determination of supported simple network management protocol versions made in step 220 of configuration page information generation method 200 (shown in FIG. 2).

In step 320, a request for information on SNMP supported features is sent to appropriate retrieval instructions for the supported simple network management protocol versions. In one exemplary implementation of the present invention, the request for information on SNMP supported features is sent to SNMPv3 retrieval instructions which retrieve information associated with authorization features and privacy features. In one exemplary implementation of the present invention, the request for information on SNMP supported features is sent to SNMPv1,2retrieval instructions which retrieve information associated with community name settings.

In step 330, information on SNMP enabled features is retrieved. In one embodiment of the present invention, the information on SNMP enabled features includes an indication of supported security features. In one exemplary implementation, the information on enabled security features includes an indication associated with support for authentication and privacy features enabled. For example, the information indicates that SNMP authentication and SNMP privacy features are not enabled, an SNMP authentication featured is enabled and a SNMP privacy feature is not enabled, or both and SNMP authentication feature and a SNMP privacy feature are enabled. In one exemplary implementation, the supported security features include an indication if a community name is set or not set.

In step 340, the information indicating SNMP enabled features is forwarded. In one exemplary implementation of the present invention, the forwarded information indicates that SNMP authentication and SNMP privacy features are not enabled, or an SNMP authentication feature is enabled and a SNMP privacy feature is not enabled, or both a SNMP authentication feature and a SNMP privacy feature are enabled.

Figure 4:
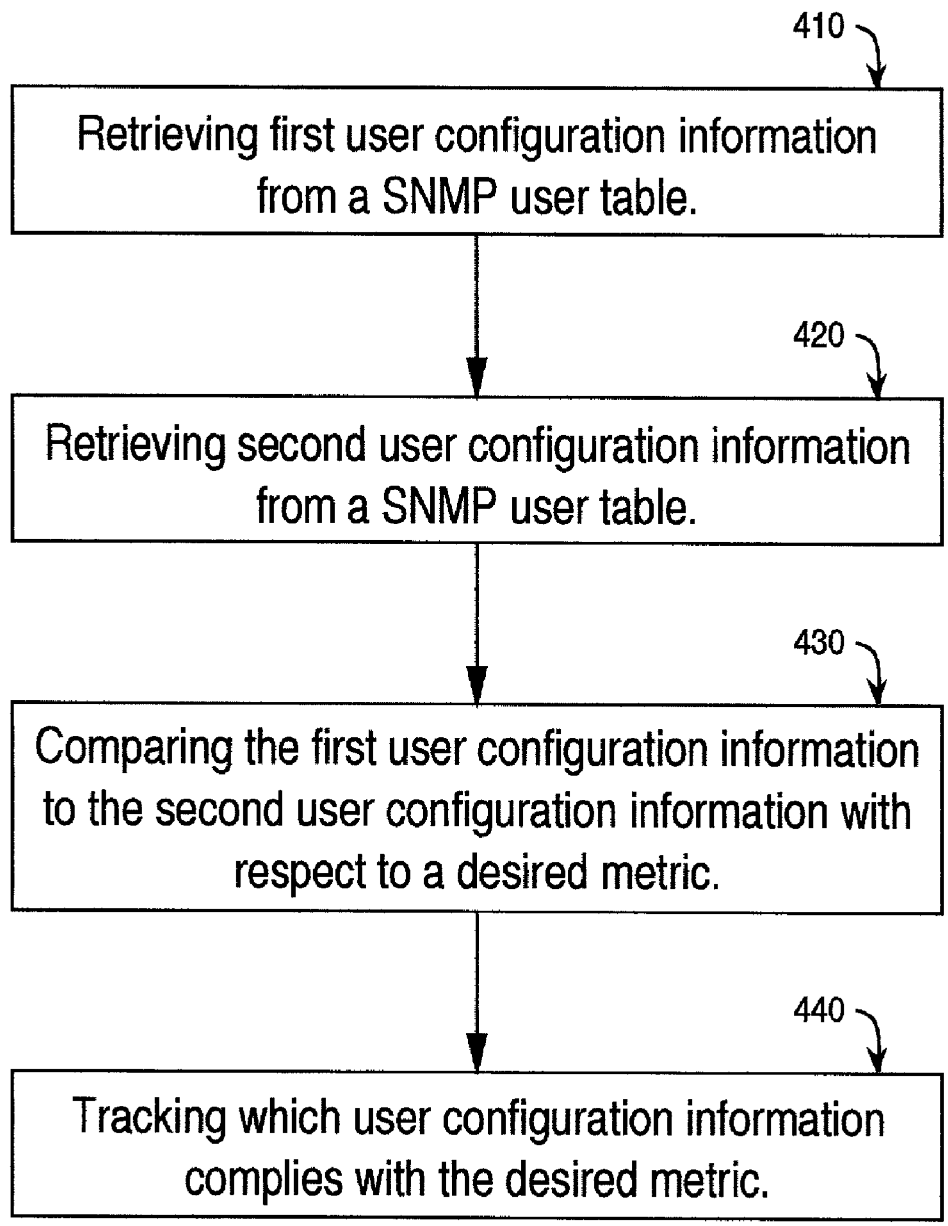
FIG. 4 is a flow chart of one embodiment of a present invention SNMP desired metric process.

FIG. 4 is a flow chart of SNMP desired metric process 400, one embodiment of a present invention of desired metric process. In one embodiment of a present invention, SNMP desired metric process 400 provides information for a configuration information generation process (e.g., a configuration information generation process utilized in step 120). In one embodiment of the present, the desired metric is a minimum security level of SNMP users. In one embodiment of the present, the desired metric is a maximum security level of SNMP users.

In step 410, account information of a first user is retrieved from a SNMP user table, wherein the account information includes first user configuration information. In one embodiment of the present invention, first user configuration information includes information indicating enabled SNMP features associated with the first user. In one exemplary implementation of the present invention, the first user configuration information includes information indicating enabled security features.

Account information of a second user is retrieved from a SNMP user table in step 420, wherein the account information includes second user configuration information. In one embodiment of the present invention, second user configuration information includes information indicating enabled SNMP features associated with the second user. In one exemplary implementation of the present invention, the second user configuration information includes information indicating enabled security features.

In step 430, the first user configuration information is compared to the second user configuration information with respect to a desired configuration metric. In one embodiment of the present invention, first user configuration information corresponding to the desired metric is compared to second user configuration information corresponding to the desired metric. In one exemplary implementation of the present invention, an enabled security feature for the first user is compared to an enabled security feature for the second user with respect to the desired metric.

In step 440, user configuration information that complies with the desired configuration metric is tracked. In one embodiment of the present, the minimum security level of the first and second users is tracked. In one embodiment of the present, the maximum security level of the first and second users is tracked.

In one embodiment of the present invention, a configuration page information generation system comprises a means for detecting an indication of a network device configuration page generation event, a means for establishing which versions of a simple network management version is supported, and a means for ascertaining supported simple network management protocol security levels. In one exemplary implementation the configuration page information generation system further comprises a means for assembling supported simple network management protocol security level information in a format compatible for printing in a configuration page. In one embodiment, the configuration page information generation further comprises a means for printing supported simple network management protocol security level information.

The means for ascertaining supported simple network management protocol security levels is capable of ascertaining support for variety of security levels. In one exemplary implementation of the present invention the means for ascertaining supported simple network management protocol security levels ascertains the simple network management protocol security level does not support authentication and privacy features. In one exemplary implementation of the present invention the means for ascertaining supported simple network management protocol security levels ascertains the simple network management protocol security level does support authentication and privacy features. In one exemplary implementation of the present invention the means for ascertaining supported simple network management protocol security levels ascertains the simple network management protocol security level does support authentication but does not support privacy features. In one exemplary implementation of the present invention the means for ascertaining supported simple network management protocol security levels ascertains the simple network management protocol security level does a community name setting.

Figure 5:
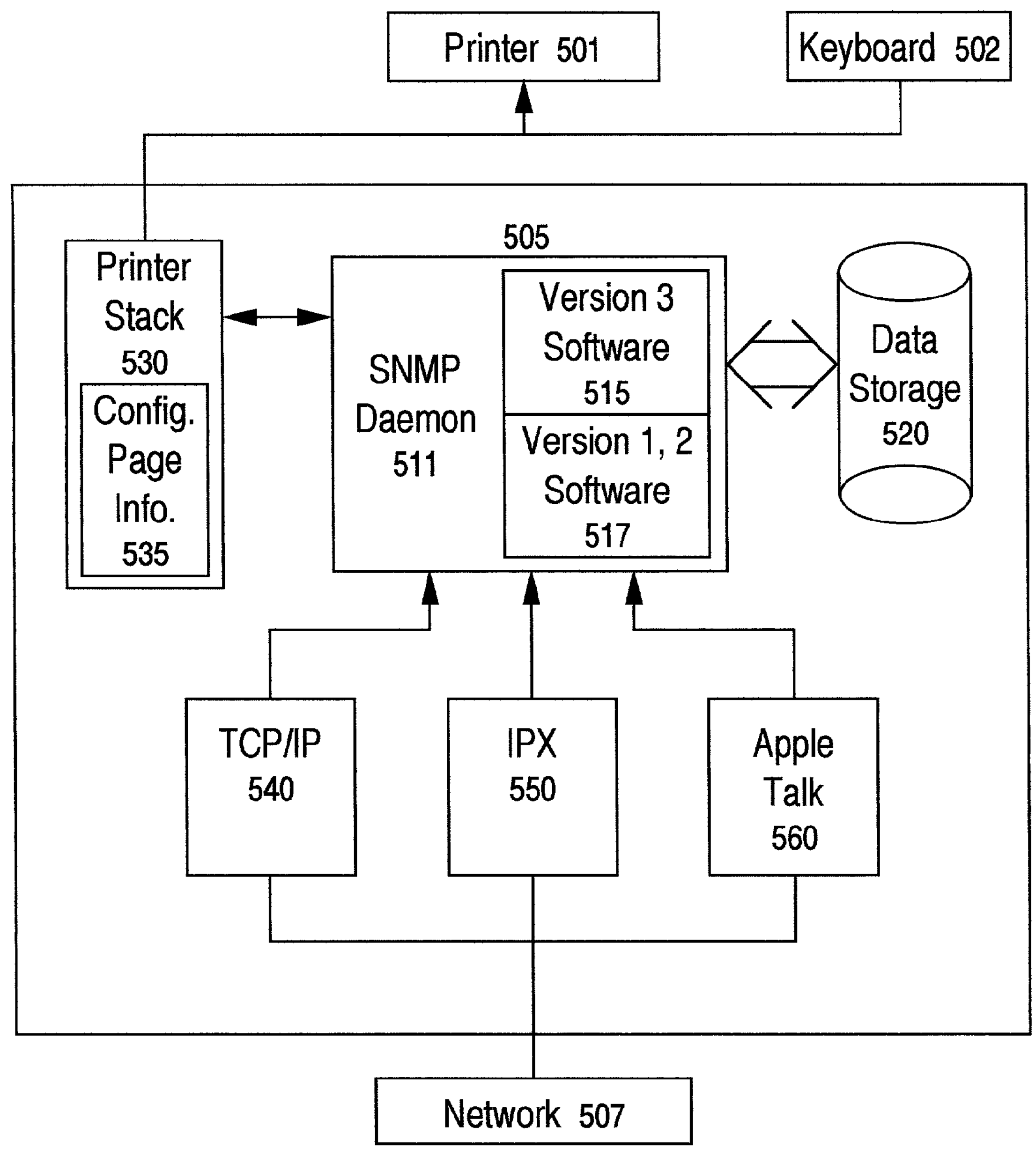
FIG. 5 is a block diagram of one embodiment of a present invention configuration page generation system.

FIG. 5 is a high level architectural block diagram of configuration page generation system 500, one embodiment of the present invention. In one embodiment of the present invention, configuration page information generation system 500 implements a configuration information generation method. Configuration page generation system 500 includes printer 501, optional keyboard 502, print server 505 and network 507. Printer 501 is coupled to print server 505 which is coupled to network 507. Printer 501 prints hardcopies of configuration information (e.g. a configuration page). Print server 505 controls information printer 501 prints, including configuration page information indicating a version of an enable SNMP. Network 507 communicates information to and from print server 505. In one embodiment, keyboard 502 also provides information to and from print server 505. In one embodiment of the present invention, JetDirect™ resides on print server 505.

Print server 505 comprises SNMP daemon 511 for determining a supported SNMP version and enabled SNMP security levels, data storage 520 for storing information, a printer stack 530 for storing and forwarding configuration page information 535, and various communication stacks for storing network communication information including TCP/IP communication stack 540, IPX (Novell) communication stack 550, and Appletalk communication stack 560. Data storage 520, printer stack 530 and the various communication stacks are communicatively coupled to said SNMP daemon. Information is communicated between print server 505 and network 507 and the communication information is assigned to one of the communication stacks (e.g., TCP/IP communication stack A40).

At the application level, SNMP daemon 511 is running in the "background" and it receives information from the communication stacks or keyboard 502. In one exemplary implementation, network packets come in and based upon a communication protocol they are placed into a communication stack and if the packets are destined for a printer port the information is forwarded to SNMP daemon 511. In one exemplary implementation, a request for a configuration page printout comes from keyboard 502 and the information is forwarded to SNMP daemon 511. SNMP daemon 511 performs a configuration information generation method (e.g. configuration information generation method 200). In one exemplary implementation, SNMP daemon 511 forwards configuration information to printer stack 530 for inclusion in a printout (e.g., a configuration page). In one embodiment, the configuration page comprises a "SNMP Versions" field which includes an indication of a supported SNMP version and enabled security features.

In one exemplary implementation, the indication of enabled security features includes "na/np" for no authentication and no privacy features enabled, "a/np" for an authentication feature enabled and a privacy feature not enabled, and "a/p" for an authentication and a privacy feature enabled. For example, the SNMP field may read "SNMP VERSIONS 1;2;3-na/np" where the "1;2;3" indicates SNMP versions one two and three are supported. In another example, "SNMP VERSIONS 3-na/np" indicates SNMP version 3 is supported and no authentication and no privacy features enabled and "SNMP VERSIONS 3-a/np" indicates SNMP version 3 is supported and an authentication feature is enabled and a privacy feature is not enabled.

In one embodiment of the present invention, SNMP daemon 511 comprises various processes including a process 515 associated with SNMPv1 and SNMPv2 and a process 517 associated with SNMPv3. Process 515 includes SNMPv1;2 retrieval instructions for retrieving user account information including enabled SNMPv1;2 security features (e.g., community name setting). Process 515 includes SNMPv3 retrieval instructions for retrieving user account information including enabled SNMPv3 security features (e.g., authentication and privacy features). In one exemplary implementation of the present invention, it registers with a socket which is a software interface to the communication stacks. SNMP daemon 511 takes the packets and based upon information in the packet which identifies if the packet is compatible with SNMP versions 1 and 2or 3. If the packet is compatible with SNMPv1 or SNMPv2 then process 517 handles the configuration information generation. If the packet is compatible with SNMPv3 then process 515 handles the configuration information generation. In one embodiment of the present invention, print server 505 comprises a microprocessor (not shown) that executes instructions associated with SNMP daemon 511.

Thus, the present invention facilitates convenient access to information associated with a supported network management protocol. In one embodiment, the present invention provides a convenient printout indication of which SNMP versions a network device supports and an enabled security level (e.g., a minimum security level). In one exemplary implementation, the printout provides critical configuration information while reducing the risk of a misleading false sense of security associated with supported but not enabled security features. In one exemplary implementation, the present invention convenient configuration printout assist efficient trouble-shooting. While, in one embodiment the present invention is compatible for complimentary use with full SNMP management applications and/or point-to point interfaces (e.g., terminal, USB connector, front panel display, etc.) relying on proprietary software to manage access, in other embodiments the present invention is capable of simplified independent operations to access configuration information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A configuration page generation system comprising:

a printer for printing a configuration page including a supported SNMP version; and a print server for receiving network communication information from one or more devices on a network, wherein said print server includes a simple network management protocol (SNMP) daemon for determining a supported SNMP version of said devices in accordance with said information received by said print server; wherein said print server forwards information on said supported SNMP version of said devices to said printer for printing in said configuration page; wherein said SNMP daemon is arranged to determine enabled SNMP security levels for one of said devices at a time, the configuration page including data on said SNMP security levels of said devices.

2. A configuration page generation system of claim 1 wherein said received network communication information is placed into a communication stack in said print server, wherein if said network communication information is destined for a printer port, the information is forwarded to said SNMP daemon.

3. The configuration page generation system of claim 1 wherein said SNMP daemon includes a first process associated with SNMPv1 and SNMPv2 and a second process associated SNMPv3.

4. The configuration generation system of claim 3 wherein said first process associated with SNMPv1 and SNMPv2 and said second process associated with SNMPv3 handle configuration information generation for packets of respective SNMP version.

5. A method of generating a configuration page comprising:

receiving, at a print server, network communication information from one or more devices on a network;

determining in a simple network management protocol (SNMP) daemon in the print server a supported SNMP version of said devices in accordance with said received information; and printing a configuration page on a printer upon demand, wherein the configuration page; wherein said determining comprises determining enabled SNMP security levels for said devices, and said printing further comprises printing data on said SNMP security levels of said devices in said configuration page includes an indication of supported SNMP versions.

6. A method according to claim 5, further comprising:

placing said received network communication information into a communication stack, and forwarding said network communication information to said SNMP daemon if it is destined for a printer port.

7. A computer readable storage medium including instructions stored thereon for directing operations of a processor, wherein said instructions are direct operations comprising:

receiving, at a print server, network communication information from one or more devices on a network;

determining in a simple network management protocol (SNMP) daemon in the print server a supported SNMP version of said devices in accordance with said received information; and printing a configuration page on a printer upon demand, wherein the configuration page; wherein said SNMP daemon is arranged to determine enabled SNMP security levels for one of said devices at a time, the configuration page including data on said SNMP security levels of said devices includes an indication of supported SNMP versions.

* * * * *